United States Patent [19]

Kregness et al.

[11] Patent Number: 4,984,153
[45] Date of Patent: Jan. 8, 1991

[54] STORAGE LOCKING CONTROL FOR A PLURALITY OF PROCESSORS WHICH SHARE A COMMON STORAGE UNIT

[75] Inventors: Glen R. Kregness, Minnetonka; Clarence W. Dekarske, St. Paul Park; Lawrence R. Fontaine, Minneapolis, all of Minn.

[73] Assignee: Unisys Corporation, Blue Bell, Pa.

[21] Appl. No.: 186,827

[22] Filed: Apr. 27, 1988

[51] Int. Cl.⁵ .............................................. G06F 13/00
[52] U.S. Cl. .................................. 364/200; 364/228.1; 364/246.6; 364/246.8
[58] Field of Search ................................ 364/200, 900

[56] References Cited

U.S. PATENT DOCUMENTS

| | | | |
|---|---|---|---|
| 3,735,360 | 5/1973 | Anderson et al. | 340/172.5 |
| 4,070,706 | 1/1978 | Scheuneman | 364/200 |
| 4,099,243 | 7/1978 | Palumbo | 364/200 |
| 4,214,304 | 7/1980 | Shimizu et al. | 364/200 |
| 4,574,350 | 3/1986 | Starr | 364/200 |
| 4,733,352 | 3/1988 | Nakamura et al. | 364/200 |

FOREIGN PATENT DOCUMENTS 0106557 4/1984 European Pat. Off. ............ 364/200

OTHER PUBLICATIONS

Patent Abstracts of Japan, vol. 6, No. 100 (P-121)(978), Jun. 9, 1982, & JP, A 5733471 (Fujitsu K.K.) Feb. 23, 1982.

IBM Technical Disclosure Bulletin, vol. 25, No. 10, Mar. 1983, (New York, U.S.), D. Gawlick: "Lock Processing in a Shared Data Base Environment", pp. 4980-4985.

Primary Examiner—Michael R. Fleming
Assistant Examiner—Debra A. Chun
Attorney, Agent, or Firm—Glenn W. Bowen; Mark T. Starr

[57] ABSTRACT

In a plural processor data processing system, a lock is obtained on a commonly shared storage means that allows for the testing of a control word associated with a selected memory address of a particular data processor wherein each of the data processors of the system is capable of independently requesting a lock on said control word. Lock requests are broadcast to each of the data processors. The lock is then established according to predefined criteria by transmission of the lock requests of all of said processor means at the same time at controlled intervals, and by providing the lock on the control word when the requesting processor is the only processor that is requesting a given control word during a control interval, or when the processor transmits its lock request simultaneously with other processor means of a lower priority.

8 Claims, 3 Drawing Sheets

BASIC TIMING

STORAGE LOCKING CONTROL FOR A PLURALITY OF PROCESSORS WHICH SHARE A COMMON STORAGE UNIT

BACKGROUND OF THE INVENTION

Storage locking instructions have been used in multi-processor systems to synchronize processes and to insure that only one process has control of a file or a storage area at a given time when more than one processor have requested control of the storage area.

The storage locking instructions used to implement these locks can take many forms, but are all built on the testing and altering of a control word in such a manner that when one processor has access to a block of memory and another processor is trying to access a block of memory with which the control word is associated (e.g., a 4 to 16 word block), it cannot gain control. Some of the terms used to describe these instructions are biased-fetch, test-and-set, increment-and-test, or conditional-replace. They all share one common characteristic in that they access a word, perform a test on that word, and if the test is successful alter the word in such a way that a subsequent processor attempting the same test will fail to ge control.

To accomplish this result, access for the test and the altering of the control word must appear to other users as an indivisible operation. In other words, a second processor must not be allowed to access the control word for testing before the first processor has altered the word. In previous generation machines this was often accomplished by accessing the word and altering it in one storage cycle (a read-alter-write operation), or by locking up the storage unit for two or more cycles, thereby preventing other processors from accessing the unit until the test and modify sequence was complete.

In modern day systems in addition to the shared storage, cache memories are often dedicated to a single processor and are not shared by other processors. With such a system locking instructions become increasingly difficult to implement with reasonable performance characteristics. This is due to the fact that the reference control cell is accessed and modified in the commonly shared memory of the system in order to give the appearance of indivisibility of access, test, and modification. Although, different processors may be running different processes in a multi-processor system, and each of these processors may have a dedicated cache memory which contains a copy of the control cell, some operations must take place in the main storage structure which is common to all of the processors. As processor performance has greatly increased, the main storage system access times have remained relatively constant. This makes locking instructions associated with the slower memories appear to be much slower than other instructions, which can operate out of their dedicated caches without concern for other processors. The slower execution time of these instructions relative to non-locking instructions tends to increasingly dominate program execution times.

U.S. Pat. No. 4,070,706 issued June 24, 1978 to James Scheuneman for a "Parallel Requestor Priority Determination and Requestor Address Matching in a Cache Memory System" and assigned to Unisys Corporation discloses a technique for controlling access to addressed locations of a main storage unit by a plurality of processors each of which had their own cache memory units. The processors each couple their address access requests to an individual register and their separate priority request signals to a priority arbitration device. These priority requests select processors in a predetermined manner. When a processor is selected it compares the address stored in its register with addresses stored in its cache. If a match occurs data is read out of a content addressable location in the cache. If a match does not occur the data is retrieved from the associated address of the main storage unit.

Each processor of the Scheuneman patent is allowed access to the main storage unit only during its own priority period and has to wait for such access until the priority arbitration device signals that higher priority devices had completed their access. Unlike prior devices, however, match determination in the Scheuneman device is complete and, if necessary, the address request is ready for transmission to the main storage unit when priority determination is finished.

The "Memory Block Protection Apparatus" of U.S. Pat. No. 4,099,243 issued July 4, 1978 to Benedict Palumbo, describes block protection of an addressed portion of a memory which allows lock-out of the addressed portion while allowing subsequent commands to simultaneously access other addressed areas of the memory.

U.S. Pat. No. 3,735,360 for "High Speed Buffer Operation in a Multi-Processing System" issued May 22, 1973 to David Anderson et al describes a system in which address information is broadcast from each processor to the others for the purpose of invalidating data in the individual memories of the processor, and for insuring that the data obtained from a processor from the shared storage is the most current value.

The above-referenced patents do not disclose the address-based locking and priority circuits of the present invention that are used to lock-out only a specified portion of the shared memory while allowing simultaneous access to the other areas.

BRIEF DESCRIPTION OF THE DRAWINGS

The present invention is described by reference to the drawings in which.

TECHNICAL DESCRIPTION OF THE INVENTION

Figure 1:
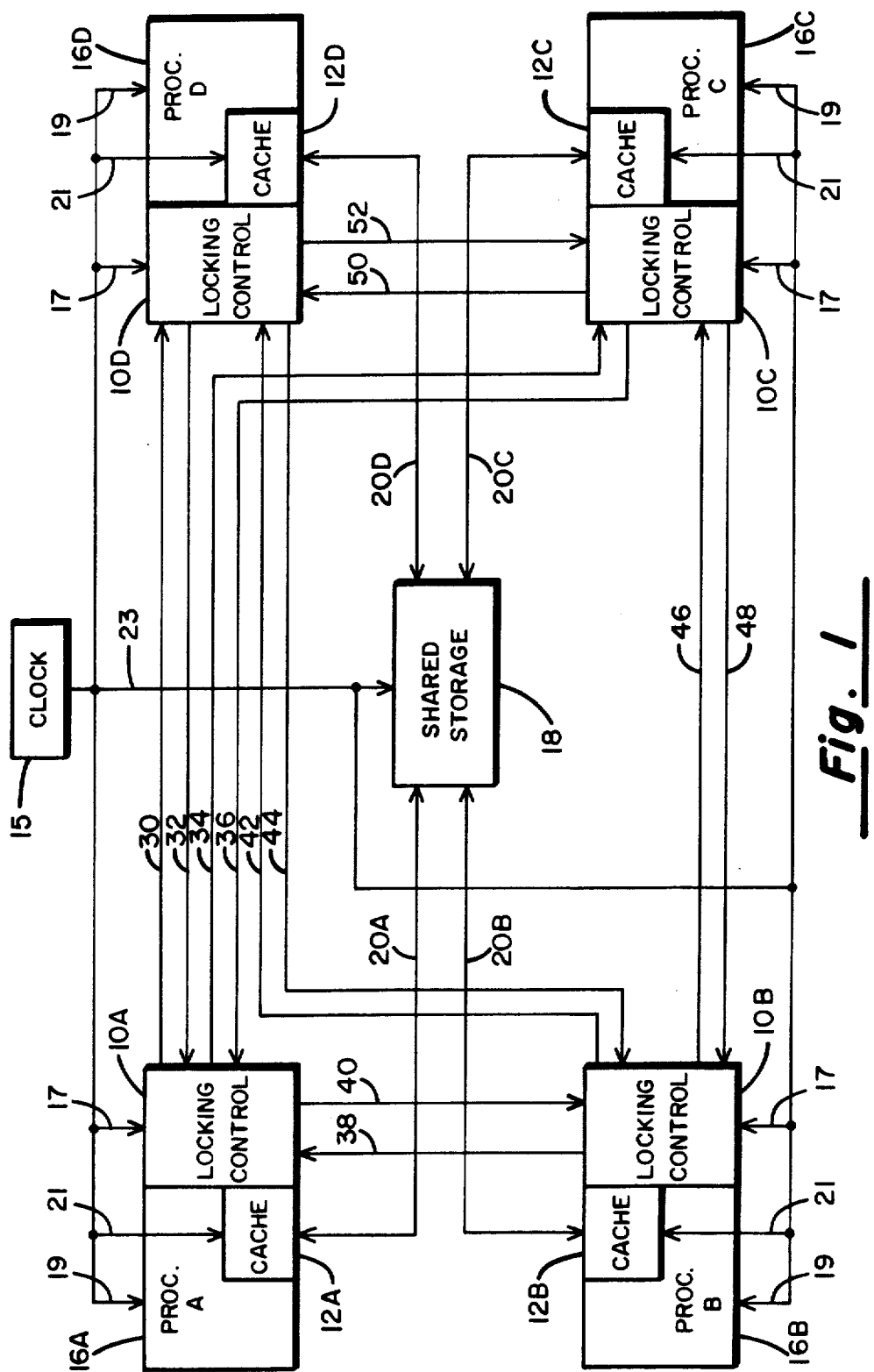
FIG. 1 is an overall block diagram of a shared memory which may be accessed by a plurality of storage processors in accordance with the present invention.

This invention relates to a method of establishing a memory lock which speeds up the locking process without locking up a storage bank for multiple cycles, or slowing down other processors which may not even be accessing the same word. The invention allows for lock testing to be completed by a dedicated cache memory which is internal to the processor that is requesting the lock.

Locking instructions are divided into two functional parts, (1) the establishing of a lock on the address being tested such that only one processor can gain control of the storage address, and (2) the actual accessing and testing of the control cell and its subsequent modification. In the present invention, the establishment of a lock on a specific address is accomplished remotely from the main storage subsystem and, therefore, this does not prevent other users of the memory from accessing the main storage system. Only the processor requesting the lock is affected by the time required to establish control of the test address.

The requirement that manipulation of the control cell be accomplished in a single indivisible cycle is also removed. This is so because the processor which gains control of the test cell retains control until the entire operation is finished. If any other processor attempts to lock the same address it will find that it is already locked and, therefore, the new processor will have to wait for release of the lock by the first processor, which will occur only upon completion of the operation of the locking instruction.

One premise of this invention is that while the storage locking instructions are intended to resolve simultaneous or near simultaneous references to the same control cell, the occurrence of this happening is relatively rare, and, therefore, it is not critical that the duration of the lock be kept very short. The only delays that another processor will incur are when a prior-requesting processor has control over the cell on which it is trying to acquire a lock.

Once a lock has been established and access has been granted, the processor in control may proceed to do the testing and possible modification of the cell without going to the main storage unit if the cell is already resident in its own cache. The processor also need not be concerned if the same addressed word is resident in another processor's cache if the caches are of the "store through" design where data is stored in the main storage unit and the cache, and the "store" operation broadcasts invalidation. The execution of a locking instruction may then proceed in the same manner as any other instruction, and it should exhibit substantially the same cache "hit rates" as any other instructions without impacting other processors that are not trying to access the locked cell.

This invention is concerned with the establishment of the lock on the test cell and not with the execution of the instruction after access to the cell has been granted. One advantage of this invention is that it frees the actual execution means from a rigid indivisible operation and allows the instruction execution to flow more naturally.

In the described embodiment the hardware may be either centralized between the multiple requesters or distributed in the requesters themselves. The modifications necessary to convert from one to the other will be obvious to those skilled in the art. The described embodiment of this invention is in distributed form. One principle advantage of distributing the locking logic is that only one cable transit time is required to establish control. If the logic is centralized the arbitration logic must return a lock-granted signal to the processor before gaining control, which requires a second cable transit time. However, less logic should be required in a centralized structure.

The principle which is used to accomplish the locking of an address in this invention requires that addresses be transmitted between processors which are capable of requesting lock operations, and that the described arbitration logic be used to determine which processor controls a specific address in the event that a conflict occurs between two or more processors which request control over the same address.

In the illustrated implementation, the cables which otherwise are used to "broadcast" cache invalidate addresses between processors are used to also broadcast the address over which lock control is being requested. The interface is synchronized so that all processors broadcast addresses at the same time. Since the transit time of the broadcasted addresses is known, it is possible to synchronize the testing of the addresses such that all processors can compare their addresses with those from other processors broadcast at the same time when one or more processors have simultaneously attempted to establish a lock on an address.

A processor which precedes another processor in time in broadcasting its lock request will be given priority by reason of the fact that its request was present prior to the time that a later requesting processor broadcast its request. The arbitration of which processor gets control is a two stage process which gives control first to those processors that transmit first, or, in the event of a simultaneous request, to a processor determined by an arbitrated protocol.

Arbitration may be as simple as assigning a processor number to each processor and arbitrating by the lowest number, (or highest number), processor to grant control in the event that the same address is requested. Priority assignments may also be utilized which rotate on a predefined basis, or which are variable dependent on operating conditions, as known in the prior art.

A processor gains control when the address it is attempting to lock does not match any addresses from other processors at the time it broadcasts its own address, or if after the transit time of his request another request for the same address has not been simultaneously broadcast from a higher priority processor. If a lock is not obtained the requesting processor must wait for a lock release from the processor which was granted control of the address before it can proceed to gain control of the address and perform an operation on the addressed word.

Upon gaining control of the locking cell, the requesting processor is free to access the word, perform the required test, and, if successful, modify the word, thereby, updating the word in memory and invalidating any duplicate copies in other caches. Control is then released over the locked address so that another processor may gain control and perform its test. The timing of the lock release must be such that it accompanies the updating of the control word in the commonly accessed memory, and, if necessary, the invalidation of that address in the caches of other processors, so that when they gain control they will always see an updated control word.

It should be noted that the modification of the word by the controlling processor is conditioned on the success of the test condition. If the test is unsuccessful, (for example, a software flag indicates that another processor has control of the structure that is protected by the control word), the control word will be left unmodified and a lock release will be sent, but other caches will not be invalidated since no change was made to the addressed word.

The present invention is illustrated by reference to the overall block diagram of FIG. 1 in which the locking circuits of the invention that are labeled 10A, 10B, 10C and 10D are associated with the processors A, B, C and D, each of which are associated with individual fast access cache storage units 12A, 12B, 12C and 12D, respectively. The processors all share a large capacity shared memory storage unit 18, and system clock 15 drives all of the elements of the system.

Data and addresses are transmitted between the cache storage units and the shared main storage unit on the buses 20A, 20B, 20C and 20D. The interconnection buses 30-52 between the locking circuits carry various signals required by the locking system, and the arrowheads on the ends of the buses representing these buses indicate direction of information flow. Control signals along with data and addresses are sent between the main storage unit and the caches on the lines 20A, 20B, 20C and 20D. The "Lock Granted" signal for each of the processors is sent on the buses 30-52. Addresses sent to particular locking circuits by the associated processors are also transmitted to all of the other locking circuits as "Lock Broadcast" signals on the buses 30-52. These buses may also be used to broadcast addresses or to invalidate or update data stored in each cache and to insure that data retrieval from the main storage unit is maintained current. "Lock Release" signals are also transmitted on the buses 30-52 upon completion of a locked process.

Figure 2:
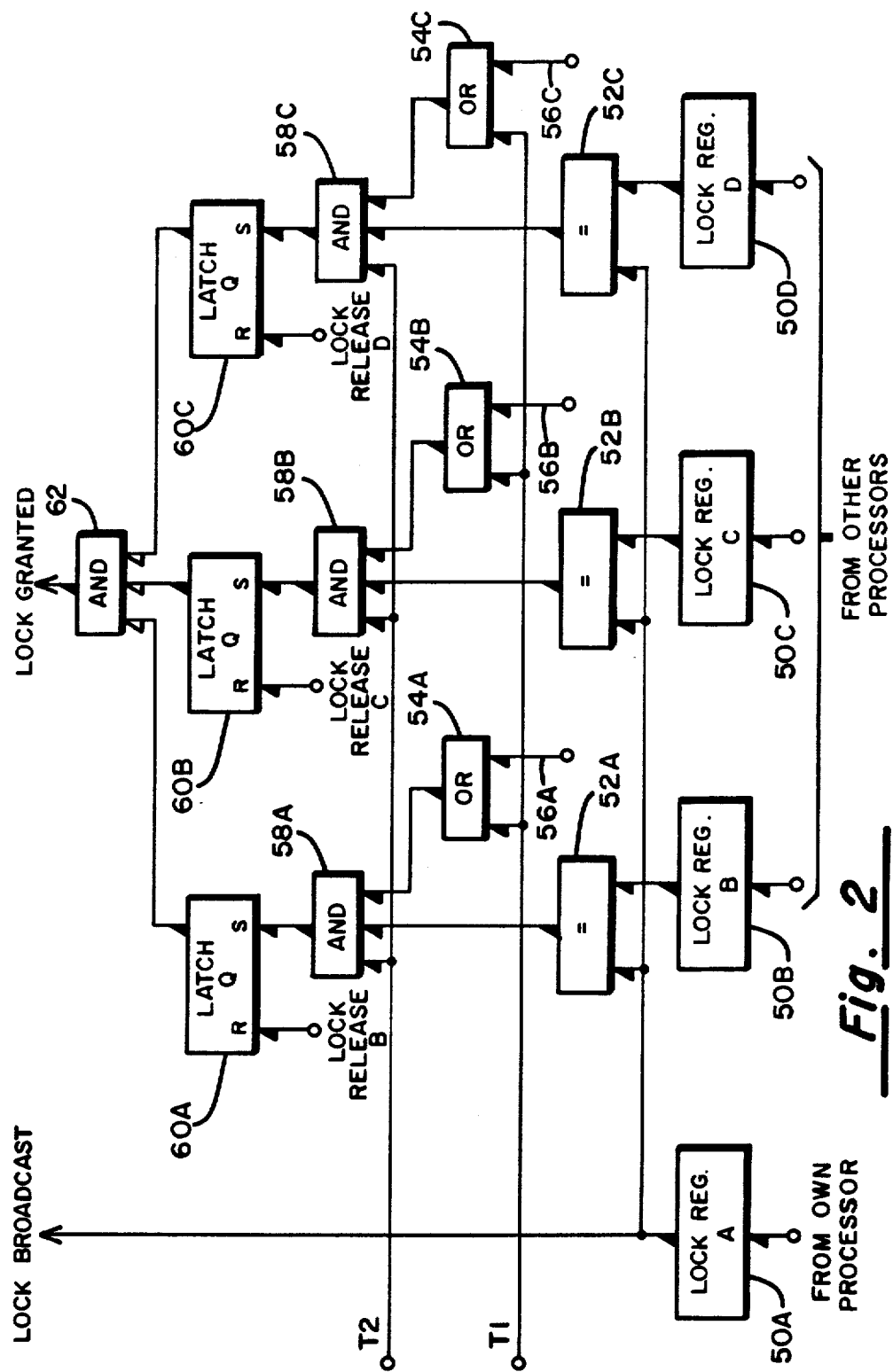
FIG. 2 is a block diagram of one of the address-based locking and priority circuits of FIG. 1.

FIG. 2 illustrates a basic block diagram of one of the locking circuits, 10A, 10B, 10C and 10D of FIG. 2 which is used to implement the locking operation for processor 16A. The implementation of the locking scheme of the present invention requires that the address to be locked be broadcast to the other processors which share locking capability in the system. The interface between the processors depends on the address which is to be checked for locking (for example, the address in the primary lock register 50A of FIG. 2). It should be noted that it is not absolutely necessary to lock just a specific address. A block or group of addresses may be locked within the scope of this invention by decoding a portion of the address code to reference the block.

The locking addresses stored in each of the primary lock registers, such as the lock register 50A, provide "Lock Broadcast" signals to the other lock circuits 10B, 10C and 10D so that addresses received from the other processors may be compared with its address in the comparators 52A, 52B and 52C. One form these comparators may take is content addressable memories although other comparators known to those skilled in the art may be used. Upon receipt of a requested address from a processor other than the processor 16A, this address is captured and held in the respective register 50B, 50C or 50D until a Lock Release signal is received from shared storage unit 18.

The registers 50B, 50C and 50D store these addresses from the time the request is received until the time the release is received. There should be N-1 of these registers where N is the number of requesting processors in the system. In this example there are three registers shown which support a four processor system. It is possible to utilize more than one register per requesting processor, as will be apparent to those skilled in the art.

Two tests are performed in the circuit using the comparators, one immediately following the transmission of the request and a second one following the transmission time of the request between processors. This time is determined by the physical structure of the system being implemented taking into account cable lengths and circuit speeds and other factors that may affect signal transition times.

A first test is performed which examines all of the comparators (e.g., 52A, 52B and 52C) since it occurs at the time of transmission and tests those addresses that are already locked by another processor at the time of test. An equal condition in one of the comparators indicates that the address being broadcast to other processors is already locked.

If no match is found on the first test then a second test is still required to resolve conflicts which may occur when two or more processors try to lock the same address simultaneously. This test is performed immediately following the transit time of the Lock Broadcast signal. If another processor had broadcast an address at the same time, this address would at this time be present in the appropriate lock register and be available for testing. In this particular event both processors would receive each other's Lock Broadcast signals at the same time. Therefore, some means of arbitration is required to determine which processor will gain control and which will wait. This is easily accomplished through an arbitrary assignment of priority by processor number.

Figure 3:
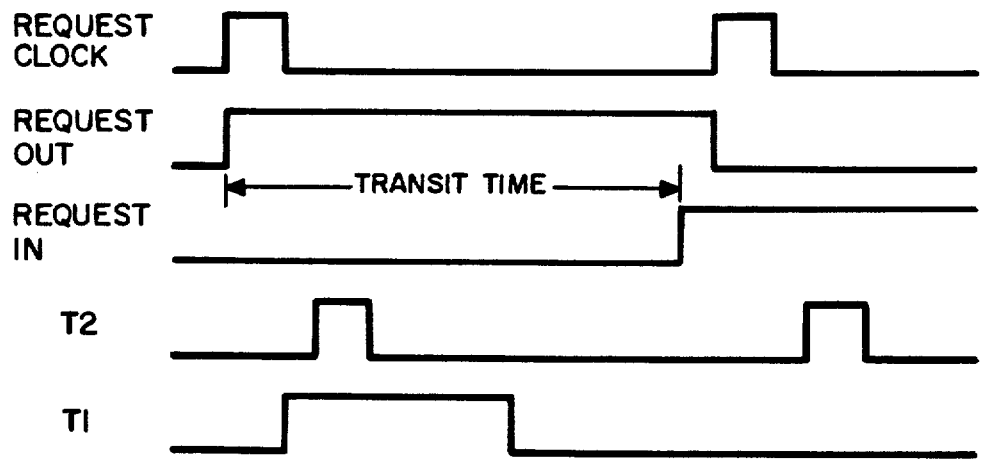
FIG. 3 is a timing chart for the operation of the circuit of FIG. 2.

In FIG. 2 the logic for priority arbitration is shown as a series of "OR" gates and "AND" gates to which strobe timing pulses of FIG. 3 are applied. Clock signals from the clock 15 are supplied on the lines 17 to the locking control units, on the lines 19 to the processors on the lines 21 to the cache memories and on the line 23 to the share storage unit.

The timing signal labelled T2, shown in FIG. 3 on the lines 17, occurs immediately following the broadcast of the requested address, and again one cycle later following the transit time of the address from one processor to another. The signal labeled T1 which is applied on the lines 17 to the "OR" circuits 54A, 54B, 54C begins just before T2 signal occurs and extends beyond the termination of this T2 signal, as shown in FIG. 3, to force all of the comparators 52A, 52B, 52C to be checked for equality during the time both signals are present. During the second strobe T2 only those comparators which have enables on the input lines 56A, 56B, 56C will be examined for equality.

Figure 4:
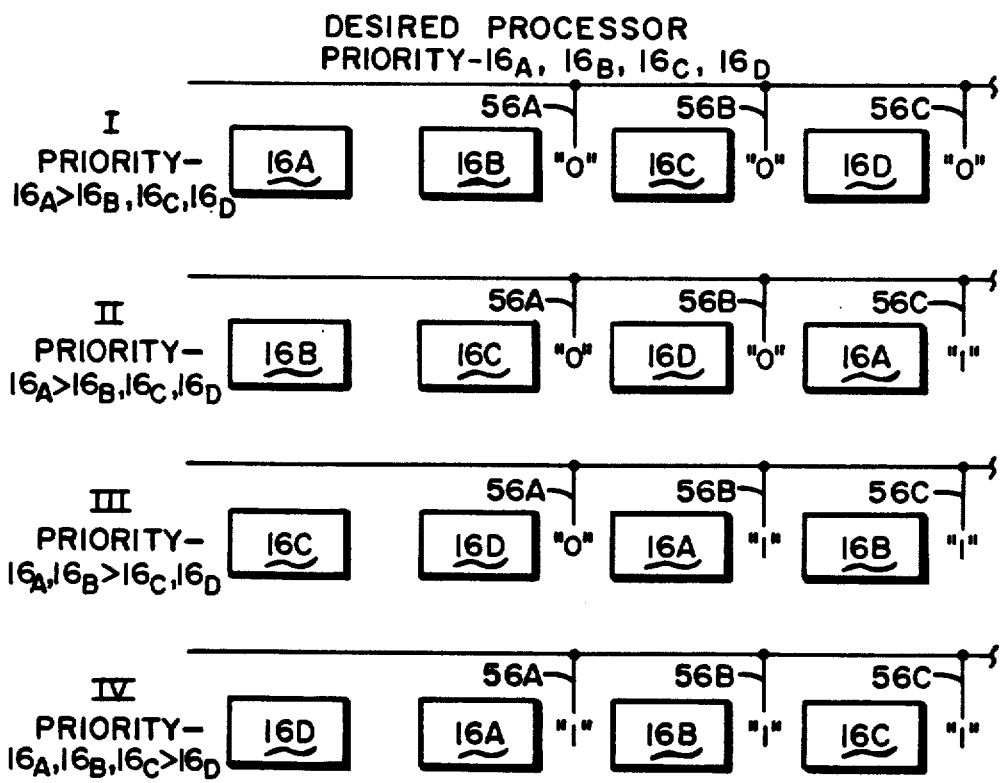
FIG. 4 is a schematic representation of an example of a priority assignment sequence for the circuit of FIG. 2.

The lines 56A, 56B and 56C are strapped, or held at a defined "0" or "1" logic level, to provide the desired priority in the case of simultaneous requests. FIG. 4 is a schematic representation of a system which implements a processor priority scheme where the processors have a priority order 16A, 16B, 16C, 16D.

If a match is found during either of the two strobe times T1 or T2, then the processor which has its requested address in a lock register 50B, 50C or 50D must wait until the appropriate lock release is received before proceeding with the locking instruction. This is accomplished through the signals coupled through the AND gates 58A, 58B, 58C that are coupled to the set, or S, input of the latches 60A, 60B, 60C to capture the state of the comparators at the two strobe times. Filled in arrowheads on the inputs of FIG. 2 indicate a gate which is activated by "high" logic level signals while open arrowheads on the inputs indicate a gate which is activated by "low" lock level signals. In the event of a conflict between the address stored in register 50A and one of the registers 50B, 50C, 50D, the associated latches are set to indicate that higher priority requests are outstanding.

When the associated Lock Release signal is received from the main storage unit on the reset, or R, input signal of the corresponding latches, they are cleared and processing may proceed. The single AND gate 62 at the top detects that all latches are clear, and provides as an output a Lock Granted signal which allows the requested instruction to execute using the data at the requested address and which removes that register from any further tests until another lock request is received.

FIG. 4 shows a representative priority scheme when processor priority is in the order of processor 16A, 16B, 16C, 16D, with processor 16A having the highest priority and processor 16D the lowest. Section I represents the circuitry for processor 16A (represented by the Letter A) and corresponds to FIG. 2. Priority strapping lines 56A, 56B and 56C are also illustrated for the locking circuits (not shown) associated with the processors 16B, 16C, 16D. When these lines have a "0" designation below them, it indicates they are at a "low," logic level, and when they have a "1" designation below them they are at a "high" logic level. Sections II, III and IV of FIG. 4, respectively, show the implementation of priority for processors 16B, 16C and 16D. Thus, Section II represents processor 16B, Section III represents processor 16C and Section IV represents processor 16D. The lines 56A, 56B and 56C to the OR gates of the circuitry associated with each of these processors are shown with the appropriate logic level needed to implement the desired priority scheme. Because a simple priority control technique can be applied with the present invention, the priority scheme can be rapidly changed, even from one cycle to the next, merely by changing the logic levels on the twelve lines (for a four processor environment), that are supplied t the prospective OR gates.

We claim:

1. A method of establishing locks in a data processing system on selected portions of an addressable storage means that is shared by a plurality of processors that comprise said data processing system comprising,
   (a) transmitting request address codes which are representative of said selected portions upon which said requesting processors request a lock, from requesting processors to all of said other processors of said plurality of processors,
   (b) storing in each of a plurality of memories, each of which memories is associated with one of said processors all of the request address codes that are transmitted at a first time by any of said processors,
   (c) comparing at a second time later than said first time a request address codes that was transmitted to said other processors by a requesting processor with request address codes that were received by said requesting processor from said other processors and that were stored in the memory associated with said requesting processor at said first time,
   (d) establishing priority rankings for all of said processors and transmitting indications of said rankings to all of said processors,
   (e) comparing again at a third later time later than said second time the locking request address code that was transmitted to said other processors by a requesting processor with only those request address codes of said other processors that were received by said requesting processor from other processors that have a higher priority ranking than said requesting processor, wherein said third time occurs substantially immediately following the receipt by each of said processors of the request address codes that were transmitted at said first time from said other processors, and
   (f) granting a lock for said requesting processors on the requested portions of said shared addressable storage means that are represented by the request address codes that were transmitted by said requesting processors only if no comparison much of the request address code for a requesting processor occurred at either of said second or third times.

2. Storage locking means for obtaining a lock on at least a portion of a shared addressable storage means by any processor of a plurality of processors in a data processing system in which all of said processors are capable of acquiring locks on the same portion of said shared storage means, comprising
   priority means coupled to all of said processors for generating lock priority signals that are representative of priority rankings of each of said processors and for transmitting signals indicative of said priority rankings to all of said processors;
   transmitting means coupled to and associated with each of said processors for transmitting request address codes between said processors each of which request address codes are representative of a portion of said shared addressable storage means upon which a lock is requested by an associated one of said processors,
   transmitting means coupled to an associated with each of said processors for transmitting request address codes between said processors, each of which request address codes are representative of a portion of said shared addressable storage means upon which a lock is requested by an associated one of said processors,
   a plurality of memory means each coupled to the one of said transmitting means that is associated with only one of said processors for receiving and storing request address codes that have been transmitted to its associated processor,
   comparison and lock-granting means coupled to all of said plurality of memory means for comparing the request address code stored in the memory means that is associated with said requesting processors, which is representative of the portion of said shared storage means upon which said associated requesting processor requests a lock, with the request address codes stored in said memory which are representative of the portions of said shared storage means upon which all of said other processors have last requested locks,
   timing means coupled to said comparison and lock-granting means for supplying first and second timing signals to said comparison and lock-granting means, wherein said first timing signal occurs substantially immediately following the transmission of a request address code by said requesting processors at a first time, and said second timing signal occurs at a second time substantially immediately following the receipt by each of said processors of the request address codes that were transmitted at said first time from said other processors, and
   said comparison and lock-granting means being further coupled to said priority means for receiving said lock priority signals and for comparing request address codes constructed to prevent a requesting processor from successfully obtaining its requested lock on the requested portion of said shared storage means when a first comparison is confirmed between the request address code transmitted by said requesting processor and the stored request address code that was received from any other processor to prevent any requesting processor from successfully obtaining a lock on a requested portion of said shared storage means if a second comparison is confirmed between the request address code transmitted by said requesting processor and the stored request address code from any higher priority ranked processor at a time subsequent to the time when said first comparison was confirmed which is sufficient to allow said request address codes to be transmitted between said processors, and for granting a lock on a requested portion of said shared addressable storage means that is represented by a request address code only if neither of said first or second comparisons were confirmed.

3. A locking control circuit for a requesting processor that shares a shared addressable storage means with other processors in a data processing system comprising, a plurality of memory means coupled to said requesting processor for storing a request address code representative of a portion of said addressable storage means upon which said requesting processor requests a lock, and for receiving and storing request address codes representative of portions of said addressable storage means upon which any of said other processors have requested a lock, signal means for providing a first timing signal that occurs substantially immediately following transmission of a request address code by said requesting processor, a second timing signal that occurs at an initial time substantially immediately following the transmission of said request address codes from said other processors and again at a later time substantially immediately following the transit time of said transmitted request address codes from said other processors to said requesting processor, and a plurality of third signals each of which have first and second binary level states and are each associated with one of said other processors, wherein each third signals represents a higher priority ranking for an associated one of said other processors with respect to said requesting processor if said associated third signal is at a first binary level and a lower priority ranking if said associated third signal is at a second binary level, comparison means coupled to said plurality of memory means and to said signal means for receiving said request address codes and said first, second and third signals, and for individually comparing said request address code of said requesting processor with each of said request address codes of said other processors at said initial time when both said first and second signals are present to provide a first comparison and at said later time upon the occurrence of said second signal at a time if any of said third signals are also present and are in a first binary level, and for providing comparison signals indicative of said first and second comparisons, and lock-granting means coupled to said comparison means for receiving said comparison signals and for providing a lock-granted signal to said processor in order to allow said processor to obtain a lock on said desired portions of said shared addressable storage means only when said comparison signals indicate that no match had occurred at either of said first or second comparisons.

4. A locking control circuit as claimed in claim 3 wherein each of said memory means comprises a separate storage register for receiving and storing each of said request address code for each of said processors.

5. A locking control circuit as claimed in claim 4 wherein said comparison means comprises a plurality of comparison elements each having first and second sets of inputs and an output which is equal in number to the number of storage registers that are provided for said other processors, wherein each of said comparison elements has its first set of inputs coupled o storage register associated with said requesting processor and its second set of inputs coupled to storage registers associated with said other processors for comparing the locking request address codes of said requesting processor with the request address codes of said other processor and for obtaining the lock on shared address storage means.

6. A locking control circuit as claimed in claim 5 wherein said comparison means comprises lock gate means comprising lock gate elements equal in number to the number of comparison elements, each of which lock gate elements are coupled to the output of one of said comparison elements for receiving its output signal therefrom and to said signal means for receiving said first and second timing signals, and the one of said plurality of third signals which is indicative of the priority ranking of said requesting processor, wherein said lock-gate means obtains said lock.

7. A locking control circuit as claimed in claim 6 wherein said comparison means comprises latch means comprising latching elements equal in number to said lockgate means, each of which latching elements are coupled to one of said lock gate means or receiving its lock signal and for indicating when any associated one of said other processors has obtained a lock on a portion of said addressable storage means until such time that a lock release signal is applied to said associated latching element by said associated one of said other processors which is coupled to said lock gate means.

8. A locking control circuit as claimed in claim 7 wherein said comparison means comprises logic means coupled to all of said latching elements for supplying said lock-granted signal only if none of said latching elements indicates that its associated processor has obtained a lock on a requested portion of said addressable storage means which has not been released.

* * * * *

UNITED STATES PATENT AND TRADEMARK OFFICE
CERTIFICATE OF CORRECTION

PATENT NO. : 4,984,153

DATED : January 8, 1991

INVENTOR(S) : Glen R. Kregness, Clarence W. Dekarske, Lawrence R. Fontaine

It is certified that error appears in the above-identified patent and that said Letters Patent is hereby corrected as shown below:

Column 8, line 2, "much" should be -- match -- .

Column 10, line 42 "lockgate" should be -- lock gate -- .

Column 10, line 43, "or" should be -- for -- .

Signed and Sealed this

Ninth Day of June, 1992

Attest:

DOUGLAS B. COMER

*Attesting Officer*    *Acting Commissioner of Patents and Trademarks*

UNITED STATES PATENT AND TRADEMARK OFFICE
CERTIFICATE OF CORRECTION

PATENT NO. : 4,984,153

DATED : January 8, 1991

INVENTOR(S) : Glen R. Kregness, Clarence W. Dekarske, Lawrence R. Fontaine

It is certified that error appears in the above-identified patent and that said Letters Patent is hereby corrected as shown below:

Column 8 lines 23-29, delete this duplicate paragraph.

Signed and Sealed this

Tenth Day of November, 1992

Attest:

DOUGLAS B. COMER

Attesting Officer

Acting Commissioner of Patents and Trademarks